United States Patent
Zhao (10) Patent No.: US 9,060,379 B2
(45) Date of Patent: Jun. 16, 2015

(54) METHOD AND DEVICE FOR PROCESSING INCOMING MESSAGE OF MULTIMODE CONTROLLER, AND MULTIMODE CONTROLLER

(75) Inventor: Yanhua Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 295 days.

(21) Appl. No.: 13/881,036

(22) PCT Filed: Jun. 23, 2011

(86) PCT No.: PCT/CN2011/076227
§ 371 (c)(1),
(2), (4) Date: Apr. 23, 2013

(87) PCT Pub. No.: WO2012/065442
PCT Pub. Date: May 24, 2012

(65) Prior Publication Data
US 2013/0217438 A1 Aug. 22, 2013

(30) Foreign Application Priority Data
Nov. 16, 2010 (CN) .......................... 2010 1 0546075

(51) Int. Cl.
*H04M 1/00* (2006.01)
*H04W 88/06* (2009.01)
*H04Q 3/00* (2006.01)

(52) U.S. Cl.
CPC ............. *H04W 88/06* (2013.01); *H04Q 3/0025* (2013.01)

(58) Field of Classification Search
CPC ........................... H04W 88/06; H04Q 3/0025
USPC ............ 455/127.4, 426.1, 432.1, 434, 435.1, 455/435.2, 436, 525, 552.1, 553.1, 160.1
See application file for complete search history.

(56) References Cited

U.S. PATENT DOCUMENTS 6,680,953 B1   1/2004 Kim
7,400,593 B2   7/2008 Choi et al.
(Continued)

FOREIGN PATENT DOCUMENTS

CN   1258982 A   7/2000
CN   1581785 A   2/2005
(Continued)

OTHER PUBLICATIONS

International Search Report in international application No. PCT/CN2011/076227, mailed on Sep. 29, 2011.
(Continued)

*Primary Examiner* — Dominic E Rego
(74) *Attorney, Agent, or Firm* — Oppedahl Patent Law Firm LLC (57) ABSTRACT

The disclosure relates to a method and device for processing an incoming message of a multimode controller, and a multimode controller, wherein the method includes: a multimode controller receives the incoming message from an abutting network element, and parsing the incoming message to construct an N-primitive message; a service standard type of the incoming message is obtained according to the N-primitive message; and the N-primitive message is processed according to the service standard type. By adding a protocol enhancement module, which obtains a service standard type of a message, between an SCCP protocol module and standard RNSAP protocol modules, the disclosure assists the SCCP protocol module and the RNSAP protocol modules in correctly and quickly establishing a corresponding relationship, saves software maintenance cost, makes up shortages of current SCCP and RNSAP protocols when supporting the multimode controller, and realizes to a function of processing signalling according to standards. Furthermore, when being only configured as a single mode or presenting in the manner of multimode, the multimode controller needs not to be modified functionally, and can accurately forward a signalling to a corresponding standard of wireless network control service layer to process.

14 Claims, 6 Drawing Sheets

(56) References Cited

U.S. PATENT DOCUMENTS

| | | |
|---|---|---|
| 2005/0083913 A1 | 4/2005 | Choi et al. |
| 2006/0128359 A1* | 6/2006 | Jung .............................. 455/406 |
| 2007/0135121 A1* | 6/2007 | Bae et al. .................... 455/432.1 |
| 2008/0207230 A1 | 8/2008 | Jung |
| 2009/0034469 A1* | 2/2009 | Kim ............................... 370/331 |
| 2009/0253426 A1* | 10/2009 | Qiu et al. .................... 455/426.1 |
| 2010/0061336 A1 | 3/2010 | Kim |
| 2010/0118830 A1* | 5/2010 | Stephenson et al. .......... 370/331 |

FOREIGN PATENT DOCUMENTS

| | | |
|---|---|---|
| CN | 1905515 A | 1/2007 |
| CN | 101193351 A | 6/2008 |
| CN | 101350836 A | 1/2009 |
| JP | 2004511178 A | 4/2004 |
| JP | 2005529552 A | 9/2005 |
| JP | 2008259188 A | 10/2008 |
| JP | 2009514477 A | 4/2009 |
| JP | 2009538548 A | 11/2009 |

OTHER PUBLICATIONS

English Translation of the Written Opinion of the International Search Authority in international application No. PCT/CN2011/076227, mailed on Sep. 29, 2011.

3GPP TS 25.423 V8.10.0, 3rd Generation Partnership Project, Technical Specification Group Radio Access Network, UTRAN Iur interface Radio Network Subsystem Application Part (RNSAP) signalling (Release 8), Sep. 2010.

Supplementary European Search Report in European application No. 11841339.2, mailed on Jul. 4, 2014.

* cited by examiner

METHOD AND DEVICE FOR PROCESSING INCOMING MESSAGE OF MULTIMODE CONTROLLER, AND MULTIMODE CONTROLLER

TECHNICAL FIELD

The disclosure relates to the field of mobile communication technologies, particular to a method and device for processing an incoming message of a multimode controller which interacts with a Base Station Controller (BSC), a Radio Network Controller (RNC), other multimode controllers and the like, and a multimode controller.

BACKGROUND

At present, more and more telecommunication equipment manufacturers release multimode controllers in which 2G and 3G are common mode, and the multimode controller enables 2G and 3G services to be integrated, so that an operator only needs to buy a set of equipment to be able to support both 2G services and 3G services, and when the equipment is used as a 2G single mode controller in an early stage and the 3G service needs to be provided in a later stage, to also be able to directly use as a multimode controller, so as to greatly decrease equipment cost of the operator; therefore, the multimode controllers are attracted more and more extensive attention.

The multimode controller generally needs to support characteristics of all interfaces in 2G or 3G single mode, such as Abis interfaces, Iub interfaces, Iur-g interfaces, Iur interfaces, A interfaces, IuCS interfaces, IuPS interfaces, Gb interfaces, and the like. For example, network interfaces of a multimode controller embody an Iur-g attribute when interacting with a 2G BSC, and the network interfaces of the multimode controller embody an Iur attribute when interacting with a 3G RNC.

Figure 1:
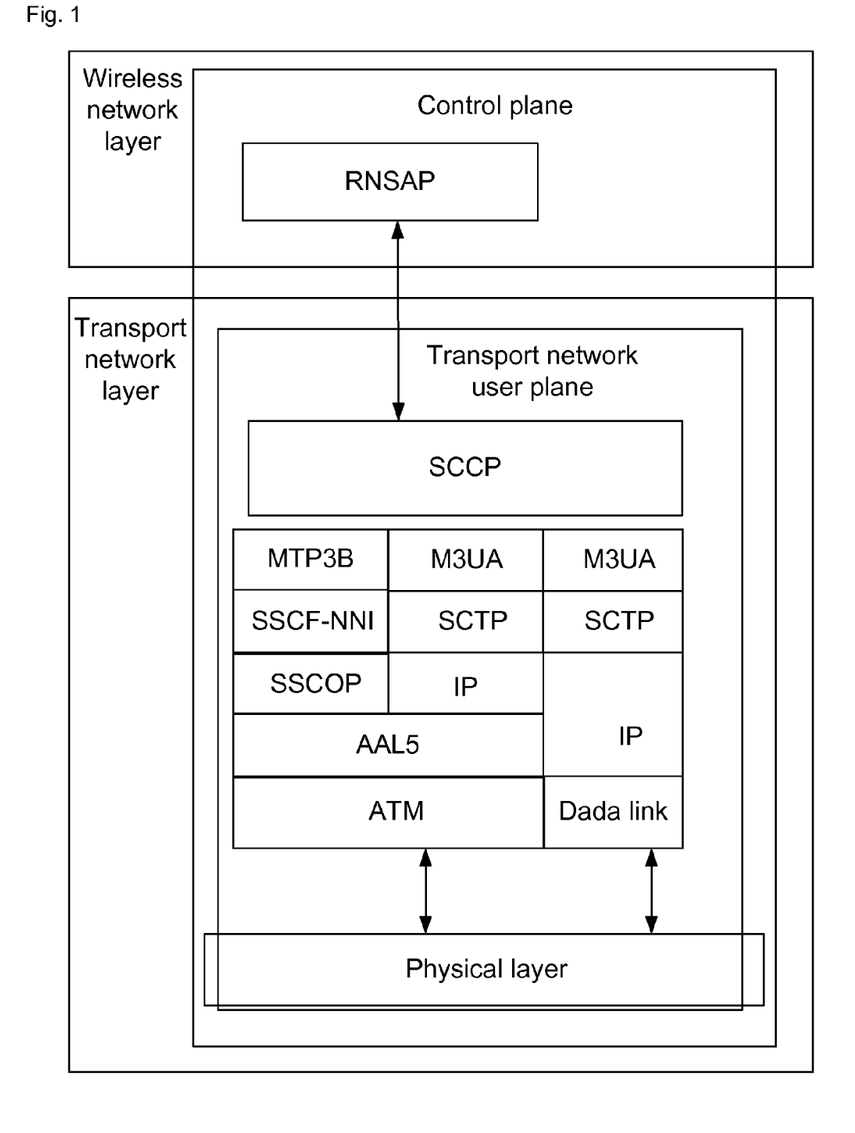
FIG. 1 shows a basic structure diagram of an Iur interface protocol stack.
Figure 2:
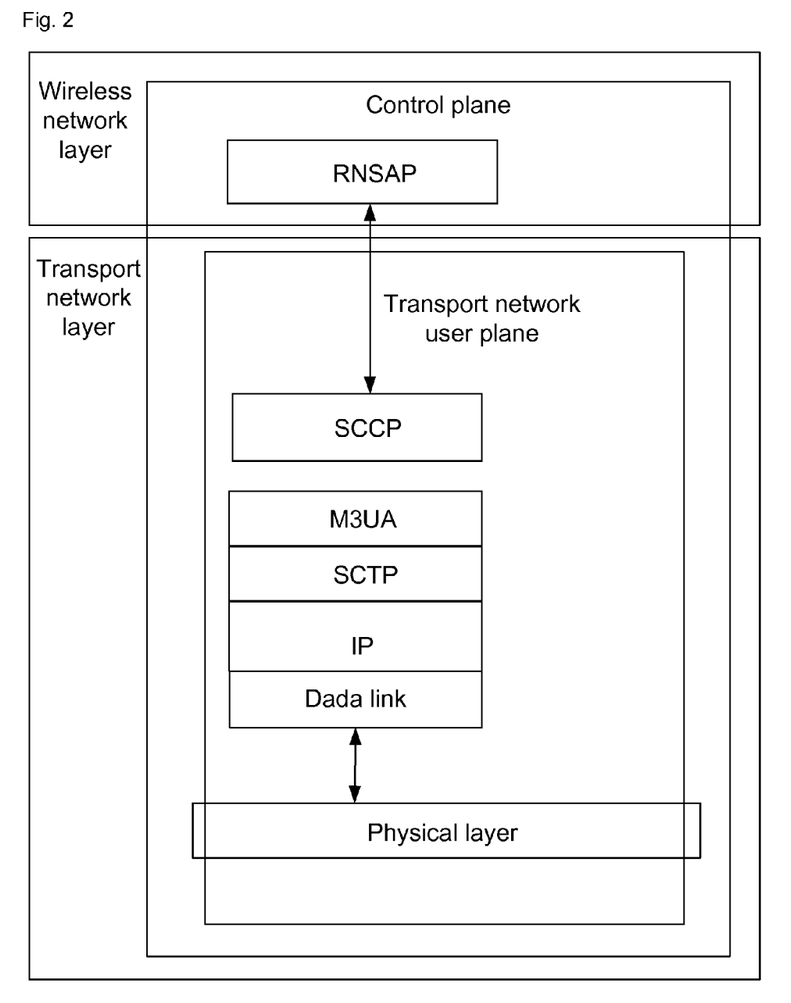
FIG. 2 shows a basic structure diagram of an Iur-g interface protocol stack.

In the single mode, an Iur interface protocol stack is shown in FIG. 1, an Iur-g interface protocol stack is shown in FIG. 2, and wireless control planes of the Iur and Iur-g interfaces both use a Signalling Connection Control Part (SCCP) protocol to bear wireless signalling. The multimode controller can realize that 2G and 3G are common mode, in terms of realization probability and cost saving, a software platform and a hardware platform should be shared as soon as possible, so in an incoming signalling procedure, a multimode controller based on sharing an SCCP protocol module should be relatively reasonable implementation.

However, in the prior art, Sub-System Numbers (SSNs) of upper users corresponding to the SCCP all are Radio Network Subsystem Application Part (RNSAP) on the Iur and Iur-g interfaces, for an SCCP protocol module, it cannot distinguish under a multimode only by the SSN whether a message received by the SCCP protocol module is an Iur service or an Iur-g service, which results in that incoming messages cannot build a correct corresponding relationship with target service users in an initial stage, increases a time delay for processing messages, and thus reduces use reliability of the multimode controller.

SUMMARY

In view of the problem above, the main purpose of the disclosure is to provide a method and device for processing an incoming message of a multimode controller, and a multimode controller, which are intended to realize a function of processing various standard services quickly and accurately by the multimode controller, and to enhance use reliability of the multimode controller.

In order to achieve the purpose above, the disclosure proposes a method for processing an incoming message of a multimode controller, which includes: receiving, by a multimode controller, an incoming message from an abutting network element, and parsing the incoming message to construct an N-primitive message; obtaining a service standard type of the incoming message according to the N-primitive message; and processing the N-primitive message according to the service standard type.

Preferably, the step of obtaining a service standard type of the incoming message according to the N-primitive message may include: pre-decoding a Radio Network Subsystem Application Part (RNSAP) message in the N-primitive message; and obtaining the service standard type of the incoming message according to a pre-decoded result.

Preferably, the step of obtaining a service standard type of the incoming message according to the N-primitive message may include: obtaining transport layer information by parsing the N-primitive message; and obtaining the service standard type of the incoming message according to the transport layer information and a standard attribute table.

Preferably, the standard attribute table may include: local end signalling points and thereof standard attribute fields, and/or opposite end signalling points and thereof standard attribute fields; or the standard attribute table may include: local end signalling point code, opposite end signalling point code, and corresponding network interface type fields; or the standard attribute table may include: local end signalling point code, opposite end signalling point code, corresponding network interface type fields, and standard attribute fields of local or opposite ends.

Preferably, the transport layer information may include Origination Point Code (OPC) and/or Destination Point Code (DPC).

The disclosure further proposes a device for processing an incoming message of a multimode controller, which includes: a Signalling Connection Control Part (SCCP) protocol module configured to receive an incoming message from an abutting network element, and parse the incoming message to construct an N-primitive message; a protocol enhancement module configured to obtain a service standard type of the incoming message according to the N-primitive message, and send the N-primitive message to a corresponding standard of Radio Network Subsystem Application Part (RNSAP) protocol module; and multiple standards of RNSAP protocol modules configured to process a corresponding standard of N-primitive message.

Preferably, the protocol enhancement module may include: a parsing unit configured to pre-decode an RNSAP message in the N-primitive message; a standard type obtaining unit configured to obtain the service standard type of the incoming message according to a pre-decoded result; and a forwarding unit configured to send the N-primitive message according to the service standard type of the incoming message to a corresponding standard of RNSAP protocol module on a wireless control plane.

Preferably, the parsing unit may be further configured to obtain transport layer information by parsing the N-primitive message; and the standard type obtaining unit may be further configured to obtain the service standard type of the incoming message according to the transport layer information and a standard attribute table.

Preferably, the standard attribute table may include: local end signalling points and thereof standard attribute fields, and/or opposite end signalling points and thereof standard attribute fields; or the standard attribute table may include: local end signalling point code, opposite end signalling point code, and corresponding network interface type fields; or the standard attribute table may include: local end signalling point code, opposite end signalling point code, corresponding network interface type fields, and standard attribute fields of local or opposite ends.

The disclosure further proposes a multimode controller including the device as described above.

The disclosure proposes a method and device for processing an incoming message of a multimode controller, and a multimode controller, and by adding a protocol enhancement module between a standard SCCP protocol module and standard RNSAP protocol modules to process the N-primitive message received by the multimode controller, obtains a service standard type of the incoming message and realizes to send an N-primitive message to a corresponding standard of RNSAP protocol module on a wireless control plane to process. Wherein, both the protocol enhancement module and the SCCP protocol module are multiplexed by the multimode controller, which not only saves software maintenance cost of the multimode controller, but also makes up shortages of current SCCP and RNSAP protocols when supporting the multimode controller, and assists the SCCP protocol module and various standards of RNSAP protocol modules in quickly establishing a corresponding relationship. Furthermore, when being only configured as a single mode or presenting in the manner of multimode, the multimode controller needs not to be modified functionally, and can accurately forward a signalling to a corresponding standard of wireless network control service layer to process.

DETAILED DESCRIPTION

The solution of embodiments of the disclosure is to add a protocol enhancement module between an SCCP protocol module and RNSAP protocol modules, to process an incoming message received by a multimode controller, to obtain a service standard type of the incoming message, and to send the incoming message to a corresponding standard of RNSAP protocol module on a wireless control plane to process.

The disclosure mainly describes processing procedures above an SCCP protocol layer based on current Iur-g and Iur standard protocol interface protocol stacks, and does not change other transmission-related protocol processing processes under the SCCP protocol layer in a standard protocol stack.

In following embodiments, the solution of the disclosure is illustrated by dual mode of Wideband Code Division Multiple Access (WCDMA)/Global System for Mobile Communications (GSM), and dual mode or multimode of other standards, for example, a combination of any two or more standards of existing wireless communication standards, such as GSM, Code Division Multiple Access (CDMA), WCDMA, Time Division-Synchronous Code Division Multiple Access (TD-SCDMA) and the like, or other subsequent evolved wireless communication standards, such as TD-SCDMA/GSM dual mode, WCDMA/CDMA/GSM multimode or the like, wherein at least two standards need to utilize an SCCP protocol incoming processing process, may refer to description of the disclosure.

Figure 3:
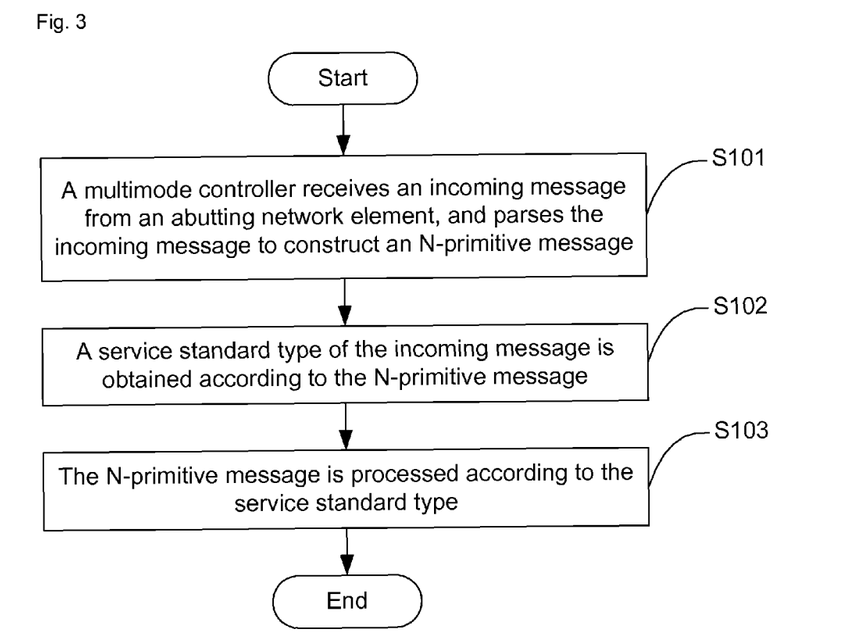
FIG. 3 shows a flowchart of one embodiment of a method for processing an incoming message of a multimode controller according to the disclosure.

As shown in FIG. 3, one embodiment of the disclosure proposes a method for processing an incoming message of a multimode controller, and the method includes:

Step S101: a multimode controller receives an incoming message from an abutting network element, and parses the incoming message to construct an N-primitive message.

At first, the multimode controller receives the incoming message from the abutting network element, and an SCCP protocol module of the multimode controller parses the incoming message to construct the N-primitive message, wherein the N-primitive message includes transport layer information such as SSN, OPC (Origination Point Code, that is, an abutting network element signalling point sending the message), DPC (Destination Point Code, that is, a local end signalling point) and other information associated with a transport layer, if the SSN is an RNSAP, then the SCCP protocol module sends the N-primitive message to a protocol enhancement module.

Step S102: a service standard type of the incoming message is obtained according to the N-primitive message.

Figure 3A:
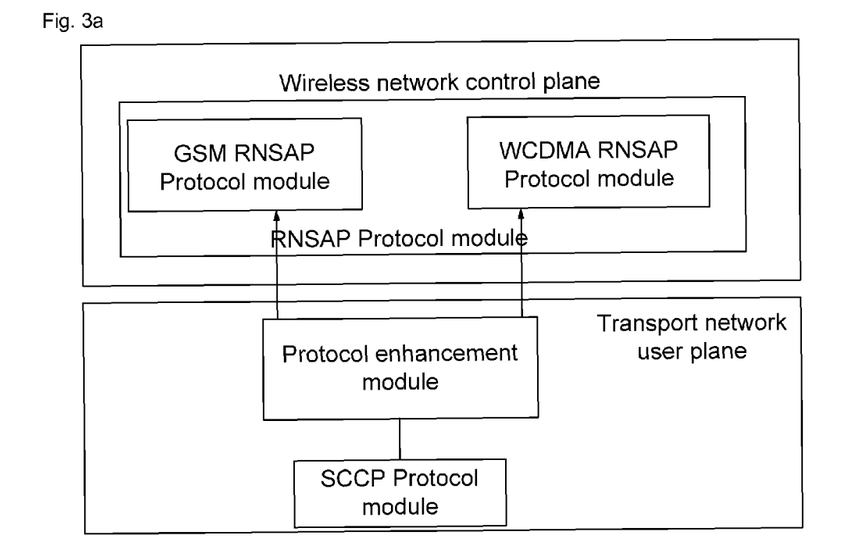
FIG. 3a shows a service architecture diagram of obtaining a service standard type of an incoming message according to an N-primitive message in one embodiment of the method for processing an incoming message of a multimode controller according to the disclosure.
Figure 3B:
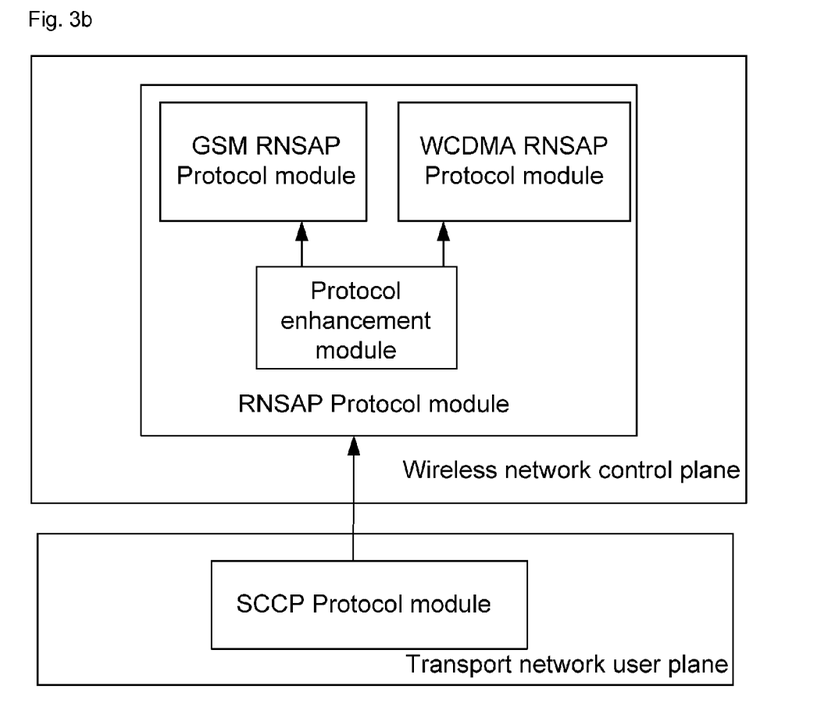
FIG. 3b shows another service architecture diagram of obtaining a service standard type of an incoming message according to an N-primitive message in one embodiment of the method for processing an incoming message of a multimode controller according to the disclosure.

In the step, the service standard type of the incoming message is obtained by the protocol enhancement module according to the N-primitive message, wherein obtaining the service standard type of the incoming message according to the N-primitive message can be completed in a transport network layer (first implementation), and also can be completed in a wireless network layer (second implementation), that is, the protocol enhancement module can belong to a transmission network user plane of the transport network layer together with the SCCP protocol module, as shown in FIG. 3a, and also can belong to a control plane of the wireless network layer together with RNSAP protocol modules, as shown in FIG. 3b. For the first implementation, the protocol enhancement module and the SCCP protocol module belong to the transport network layer, and the protocol enhancement module can obtain the related transport layer information from the N-primitive message, wherein the transport layer information includes SSN, OPC, DPC and other information, a network element corresponding to a signalling point in the transport layer information is of a standard attribute, which can be obtained by a local end when docks with an abutting network element, for example, whether the abutting network element is a 2G BSC or a 3G RNC, so the corresponding standard type can be obtained according to the standard attribute of the network element corresponding to an origination signalling point and/or a destination signalling point in the transport layer information.

For the second implementation, after the SCCP protocol module receives the incoming message, if the SSN is the RNSAP, then the SCCP protocol module sends the N-primitive message to a wireless network control layer according to the standard N-primitive message between the SCCP and the RNSAP, and the protocol enhancement module in the wireless network control layer obtains an RNSAP message from the N-primitive message sent from the SCCP to the RNSAP, and pre-decodes the RNSAP message. Information such as a cell number, an information type, a target RNC ID and the like can be obtained by decoding the RNSAP message, for example, the cell number is unique, whether the RNSAP message being of the 2G standard or the 3G standard is certain, therefore that the target RNSAP message is which standard service can be determined according to the de-coded result. After obtaining the service standard type of the incoming message, the incoming message is sent by the protocol enhancement module to the corresponding standard of RNSAP protocol module to process. Each standard service has its own protocol module, there are multiple RNSAP protocol modules according to different standard types, and each standard of RNSAP protocol module processes an N-primitive message corresponding to the standard.

Step S103: corresponding processing is performed on the N-primitive message according to the service standard type.

Corresponding standards of the N-primitive messages are performed by different standards of RNSAP protocol modules.

Figure 4:
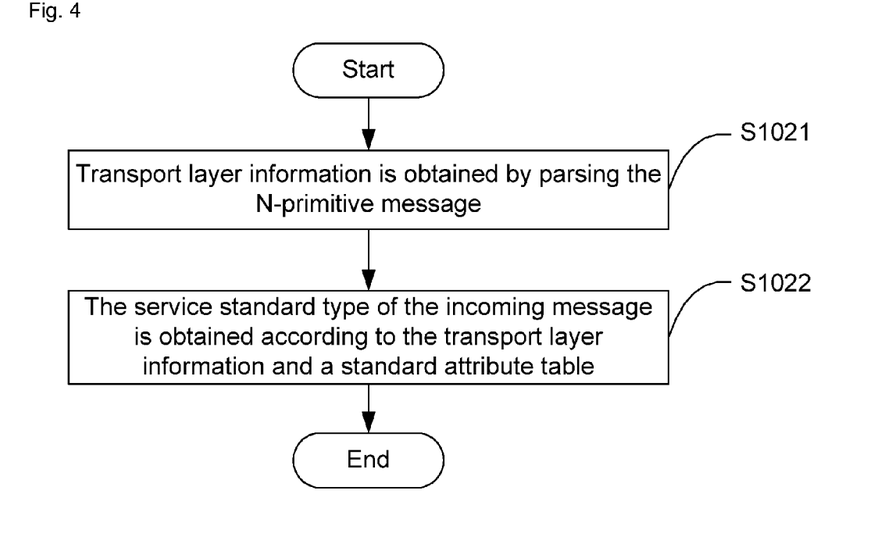
FIG. 4 shows an implementation flowchart of obtaining a service standard type of an incoming message according to an N-primitive message in one embodiment of the method for processing an incoming message of a multimode controller according to the disclosure.

As shown in FIG. 4, corresponding to the above-mentioned first implementation of obtaining the service standard type, Step S102 includes:

Step S1021: transport layer information is obtained by parsing the N-primitive message.

The transport layer information includes: SSN and OPC and/or DPC.

Step S1022: the service standard type of the incoming message is obtained according to the transport layer information and a standard attribute table.

The standard attribute table includes: local end signalling points and thereof standard attribute fields, and/or opposite end signalling points and thereof standard attribute fields; or the standard attribute table includes: local end signalling point code, opposite end signalling point code, and corresponding network interface type fields; or the standard attribute table includes: local end signalling point code, opposite end signalling point code, corresponding network interface type fields, and standard attribute fields of local or opposite ends.

The signalling points in the transport layer information correspond to local end network element signalling points and opposite end network element signalling points respectively. The standard attribute table includes local end signalling points and thereof standard attribute fields. For example, a multimode controller is configured with two signalling points such as a signalling point 1 and a signalling point 2, wherein the signalling point 1 is of a 2G standard attribute and the signalling point 2 is of a 3G standard attribute. When the DPC of a message which is received by the local end is the signalling point 2, it can be obtained from inquiring the standard attribute table that the signalling received is a 3G service; and the standard attribute table can further include local end network element signalling point fields, opposite end network element signalling point fields, corresponding network interface type fields and other fields. For example, the Iur interface is determined according to the OPC and DPC in the transport layer information, and the signalling received is determined as a 3G standard service directly; and the standard attribute table can further include local end network element signalling point fields, opposite end network element signalling point fields, corresponding network interface type fields, opposite end network element signalling point standard attribute fields and other fields, for example, by determining that the network interface is the Iur-g interface as well as then based on that the standard type corresponding to the OPC (source signalling point sending the message) is of a 3G standard, it can be determined that the signalling received is a 2G standard service.

Figure 5:
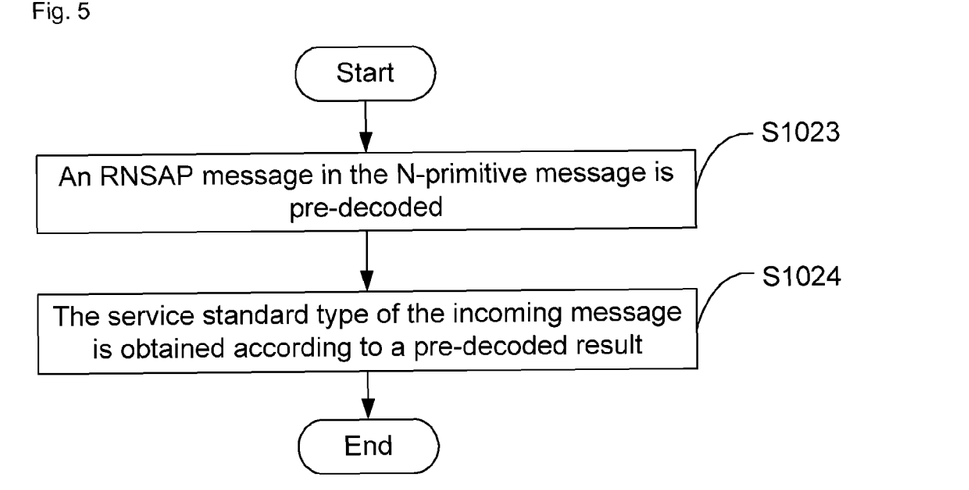
FIG. 5 shows another implementation flowchart of obtaining a service standard type of an incoming message according to an N-primitive message in one embodiment of the method for processing an incoming message of a multimode controller according to the disclosure.

As shown in FIG. 5, corresponding to the above-mentioned second implementation of obtaining the service standard type, in the embodiment, Step S102 may include:

Step S1023: an RNSAP message in the N-primitive message is pre-decoded.

Step S1024: the service standard type of the incoming message is obtained according to a pre-decoded result.

The whole implementing flow of the embodiment is described below for two implementation of obtaining the service standard type corresponding to FIG. 4 and FIG. 5 respectively.

Taking RNSAP protocol modules of 2G and 3G standards (that is, a GSM RNSAP protocol module and a WCDMA RNSAP protocol module) as an example, the whole implementing flow of the embodiment is described in detail as follows.

Example one: taking a dual-mode controller receiving a CR message from an abutting RNC as an example, an SCCP protocol module parses the CR message to construct an N-primitive message. If the CR message does not include a Calling address field, then one Calling address field can be filled in after obtaining OPC information by a layer 3 signalling link protocol layer (such as an MTP3B layer, or an M3UA layer or the like) which receives the CR message. A Called address field in the N-primitive message includes transport layer information such as DPC, SSN and the like, and the Calling address field includes transport layer information such as OPC and the like. The SCCP protocol module can also add the OPC and DPC information obtained from a transmission signalling layer into the standard N-primitive message directly. When finding that the SSN is an RNSAP, the SCCP protocol module sends the SSN to a protocol enhancement module. The protocol enhancement module can obtain, by inquiring the standard attribute table according to the transport layer information OPC and DPC in the N-primitive message, that the OPC (opposite end network element signalling point) corresponds to a network element of 3G attribute and the DPC (local end signalling point) corresponds to a network element of 2G attribute, therefore the CR message is a 2G standard service; and the protocol enhancement module can further directly determine, directly according to that the DPC (local end signalling point) corresponds to a network element of 2G attribute, that the CR message is a 2G standard service. The protocol enhancement module sends the N-primitive message to the GSM RNSAP protocol module to continue to process.

After an SCCP connection is established, the SCCP protocol module has established a correct corresponding relationship of logic entities with the GSM RNSAP protocol module, at this moment, the SCCP protocol module can participle in processing flows no longer, and an incoming message associated with the SCCP connection can be sent to the GSM RNSAP protocol module at the SCCP protocol module.

Example two: taking a dual-mode controller being configured to a single 3G controller as an example, the dual-mode controller receives a UDT message from an abutting RNC, an SCCP protocol module parses the UDT message to construct an N-primitive message. SSN and DPC information can be obtained from a Called address in the UDT message, and OPC information can be obtained from a Calling address in the UDT message directly. A protocol enhancement module can obtain, according to the transport layer information OPC and DPC in the N-primitive message, that the OPC (opposite end network element signalling point) corresponds to a network element of 3G attribute and the DPC (local end signalling point) corresponds to a network element of 3G attribute, therefore the UDT message is a 3G standard service, and the protocol enhancement module sends the standard N-primitive message to the WCDMA RNSAP protocol module to continue to process.

Taking RNSAP protocol modules of 2G and 3G standards (that is, a GSM RNSAP protocol module and a WCDMA RNSAP protocol module) as an example, the whole implementing flow of the embodiment is described in detail as follows.

Example one: taking a dual-mode controller receiving a CR message from an abutting RNC as an example, an SCCP protocol module parses the CR message to construct an N-primitive message, and sends the N-primitive message to a protocol enhancement module in a wireless network control layer, and the protocol enhancement module pre-decodes an RNSAP message in the N-primitive message, wherein the RNSAP message is a wireless link establishment request message of the Iur interface, in which has an ID of a cell which is of a 2G standard, therefore the incoming message is a 2G standard service, and the protocol enhancement module sends the N-primitive message to the GSM RNSAP protocol module to continue to process.

Example two: taking a dual-mode controller being configured to a single 3G controller as an example, the dual-mode controller receives a UDT message from an abutting RNC, an SCCP protocol module parses the UDT message to construct an N-primitive message, and sends the N-primitive message to a protocol enhancement module in a wireless network control layer, and the protocol enhancement module pre-decodes an RNSAP message in the N-primitive message, wherein the RNSAP message is a paging message, in which an ID of a cell which is of a 3G standard is included, therefore the incoming message is a 3G standard service, and the protocol enhancement module sends the N-primitive message to the WCDMA RNSAP protocol module to continue to process.

In addition, the protocol enhancement module is an independent module listed individually for functionally distinguishing an original standard protocol module, in a specific implementing process, the protocol enhancement module can also be implemented by integrating functions of the protocol enhancement module into an SCCP protocol module, and it needs to modify a part of incoming processing procedure of the SCCP protocol at this moment; the protocol enhancement module can further be implemented by integrating functions of the protocol enhancement module into an RNSAP protocol module, specifically, the SCCP sends all incoming messages to a certain standard of RNSAP protocol module, the certain standard of RNSAP protocol module forwards, after determining all standard types of all incoming messages, the incoming messages to corresponding standards of RNSAP protocol modules to process. Distinguishing standards and forwarding functions of the protocol enhancement module in the embodiment of the disclosure can further be implemented outside the standard protocol modules or by modifying the standard protocol modules.

In the embodiment, by adding the protocol enhancement module between the SCCP protocol module and the RNSAP protocol modules to process the N-primitive message received by the multimode controller, the service standard type of the incoming message is obtained, and it is realized that the N-primitive message is sent to the corresponding standard of RNSAP protocol module on the wireless control plane to process. Wherein, both the protocol enhancement module and the SCCP protocol module are multiplexed by the multimode controller, which not only saves software maintenance cost of the multimode controller, but also makes up shortages of current SCCP and RNSAP protocols when supporting the multimode controller, and realizes a function of distributing signalling according to standards. Furthermore, when being only configured as a single mode or presenting in the manner of multimode, the multimode controller needs not to be modified functionally, and can accurately forward a signalling to a corresponding standard of wireless network control service layer to process.

Figure 6:
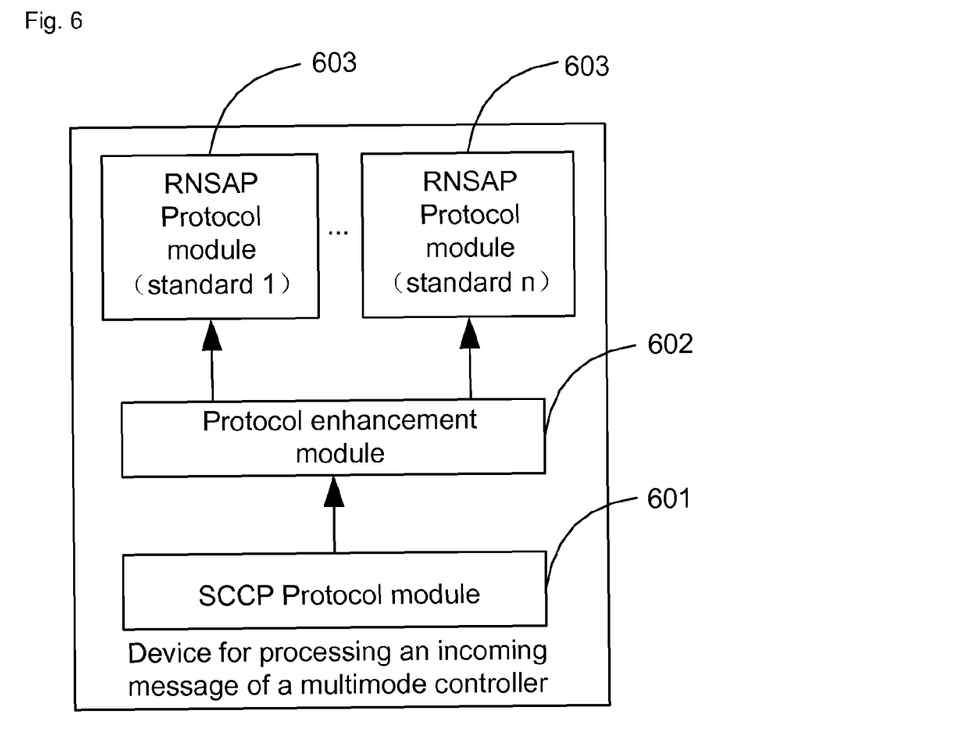
FIG. 6 shows a structure diagram of one embodiment of a device for processing an incoming message of a multimode controller according to the disclosure.

As shown in FIG. 6, the disclosure proposes a device for processing an incoming message of a multimode controller, which includes: an SCCP protocol module 601, a protocol enhancement module 602, and multiple different standards of RNSAP protocol modules 603, wherein:

the SCCP protocol module 601 is configured to receive an incoming message from an abutting network element, and parse the incoming message to construct an N-primitive message;

the multimode controller receives the incoming message from the abutting network element, and the SCCP protocol module 601 parses the incoming message to construct the N-primitive message, which includes transport layer information such as SSN, OPC (abutting network element signalling point sending the message), DPC (local end signalling point) and other information associated with a transport layer, if the SSN is an RNSAP, then the SCCP protocol module 601 sends the N-primitive message to the protocol enhancement module 602;

the protocol enhancement module 602 is configured to obtain a service standard type of the incoming message according to the N-primitive message, and send the N-primitive message to a corresponding standard of RNSAP protocol module 603 on a wireless control plane to process; and the multiple standards of RNSAP protocol modules 603 are configured to process a corresponding standard of N-primitive message. Each standard service has its own protocol module, there are multiple RNSAP protocol modules according to different standard types, and each standard of RNSAP protocol module processes an N-primitive message corresponding to the standard.

In the embodiment, the service standard type of the incoming message is obtained by the protocol enhancement module 602 according to the N-primitive message, wherein obtaining the service standard type of the incoming message according to the N-primitive message can be completed in a transport network layer (first implementation), and also can be completed in a wireless network layer (second implementation), that is, the protocol enhancement module 602 can belong to a transmission network user plane of the transport network layer together with the SCCP protocol module 601, and also can belong to a control plane of the wireless network layer together with the RNSAP protocol modules 603.

For the first implementation, the protocol enhancement module 602 and the SCCP protocol module 601 belong to the transport network layer, and the protocol enhancement module 602 can obtain the related transport layer information from the N-primitive message, wherein the transport layer information at least includes SSN, OPC, and/or DPC and the like, and can obtain the service standard type of the incoming message according to the transport layer information and the standard attribute table.

The standard attribute table includes: local end signalling points and thereof standard attribute fields, and/or opposite end signalling points and thereof standard attribute fields; or the standard attribute table includes: Origination Point Code (OPC), Destination Point Code (DPC), and corresponding network interface type fields; or the standard attribute table includes: OPC, DPC, corresponding network interface type fields, and standard attribute fields of the OPC.

For the second implementation, after the SCCP protocol module 601 receives the incoming message, if the SSN is the RNSAP, then the SCCP protocol module 601 sends the N-primitive message to a wireless network layer, and the protocol enhancement module 602 in the wireless network layer obtains the RNSAP message from the N-primitive message sent by the SCCP protocol module 601, and pre-decodes the RNSAP message, accordingly, that the RNSAP message is which standard service can be determined according to the de-coded result, that is, the service standard type of the above incoming message can be obtained.

After obtaining the service standard type of the incoming message, the incoming message is sent by the protocol enhancement module 602 to the corresponding standard of RNSAP protocol module 603 to be processed by the standard of RNSAP protocol module 603. Each standard service has its own protocol module, there are multiple RNSAP protocol modules according to different standard types, and each standard of RNSAP protocol module processes an N-primitive message corresponding to the standard.

Figure 7:
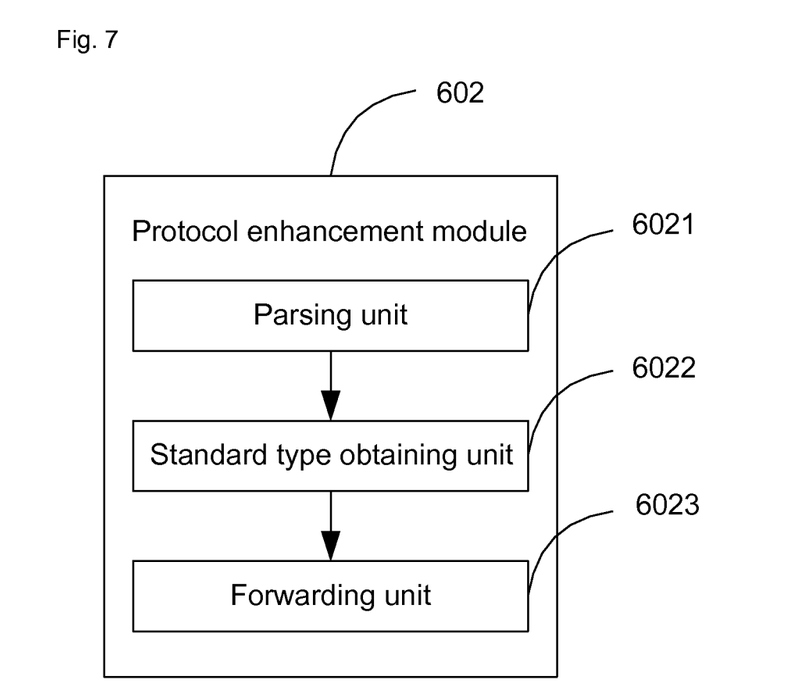
FIG. 7 shows a structure diagram of a protocol enhancement module in one embodiment of a device for processing an incoming message of a multimode controller according to the disclosure.

As shown in FIG. 7, the protocol enhancement module 602 includes: a parsing unit 6021 and a standard type obtaining unit 6022, wherein:

the parsing unit 6021 is configured to obtain transport layer information by parsing the N-primitive message; and the standard type obtaining unit 6022 is configured to obtain the service standard type of the incoming message according to the transport layer information and a standard attribute table.

As mentioned above, the standard attribute table includes: local end signalling points and thereof standard attribute fields, and/or opposite end signalling points and thereof standard attribute fields; or the standard attribute table includes: Origination Point Code (OPC), Destination Point Code (DPC), and corresponding network interface type fields; or the standard attribute table includes: OPC, DPC, corresponding network interface type fields, and standard attribute fields of the OPC.

The signalling points in the transport layer information correspond to local end network elements and opposite end network elements respectively, the network elements corresponding to the signalling points are of standard attributes, the local end can obtain the standard attribute when docking with an abutting network element, for example, if the abutting network element is a BSC of 2G, then the network element standard attribute of the BSC is 2G. Therefore, a corresponding standard type can be obtained according to the network element standard attributes corresponding to source signalling points and/or target signalling points in the transport layer information; which network interface can also be determined according to a corresponding table between pre-configured signalling points and network interface types, and a corresponding standard type can be obtained according to the network interface directly, for example, an Iur interface can be determined according to the OPC and DPC in the transport layer information, and then a 3G standard service can be determined directly; when the standard type cannot determined directly according to the corresponding table between the pre-configured signalling points and the network interface types, the corresponding standard type can be obtained further according to a network element standard attribute corresponding to a source signalling point and/or a target signalling point in the transport layer information, for example, by determining that the network interface is the Iur-g interface and in accordance with that the standard type corresponding to the OPC (source signalling point sending the message) is of a 3G standard, then a 2G standard service can be determined.

A forwarding unit 6023 is configured to send the N-primitive message according to a standard of the N-primitive message to a corresponding standard of RNSAP protocol module on a wireless control plane.

Further, the parsing unit 6021 is further configured to pre-decode the RNSAP message in the N-primitive message; and the standard type obtaining unit 6022 is further configured to obtain the service standard type of the incoming message according to a pre-decoded result.

It needs to be illustrated that the protocol enhancement module 602 is an independent module listed individually for functionally distinguishing an original standard protocol module, in a specific implementing process, the protocol enhancement module 602 can also be implemented by integrating functions of the protocol enhancement module into an SCCP protocol module 601, and it needs to modify a part of incoming processing procedure of the SCCP protocol at this moment; the protocol enhancement module can further be implemented by integrating functions of the protocol enhancement module into an RNSAP protocol module 603, specifically, the SCCP sends all incoming messages to a certain standard of RNSAP protocol module 603, the certain standard of RNSAP protocol module 603 forwards, after determining all standard types of all incoming messages, the incoming messages to corresponding standards of RNSAP protocol modules to process. Distinguishing standards and forwarding functions of the protocol enhancement module 602 in the embodiment of the disclosure can further be implemented outside the standard protocol modules or by modifying the standard protocol modules.

Figure 8:
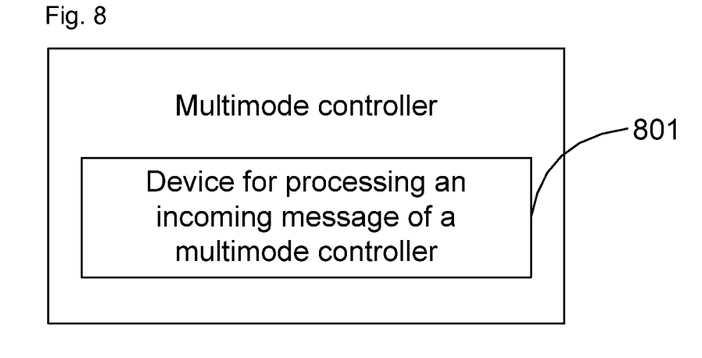
FIG. 8 shows a structure diagram of one embodiment of a multimode controller according to the disclosure.

As shown in FIG. 8, one embodiment of the disclosure proposes a multimode controller, which is configured to receive the incoming message from an abutting network element, and parse the incoming message to construct an N-primitive message; and obtain a service standard type of the incoming message according to the N-primitive message; and process the N-primitive message according to the service standard type.

In the embodiment, the multimode controller includes the device 801 mentioned in the above embodiments.

In the embodiment, by adding the protocol enhancement module between the SCCP protocol module and the RNSAP protocol modules to process the N-primitive message received by the multimode controller, the service standard type of the incoming message is obtained, and it is realized that the N-primitive message is sent to the corresponding standard of RNSAP protocol module on the wireless control plane to process. Wherein, both the protocol enhancement module and the SCCP protocol module are multiplexed by the multimode controller, which not only saves software maintenance cost of the multimode controller, but also makes up shortages of current SCCP and RNSAP protocols when supporting the multimode controller, and realizes a function of distributing signalling according to standards. Furthermore, when being only configured as a single mode or presenting in the manner of multimode, the multimode controller needs not to be modified functionally, and can accurately forward a signalling to a corresponding standard of wireless network control service layer to process.

The above are only preferable embodiments of the present disclosure, and are not used for limiting to the scope of protection of the present disclosure. Any equivalent structures or procedure alternations made by using the description and the drawings of the present disclosure, or direct or indirect applications in other related technical fields thereof shall fall within the scope of protection of the present disclosure.

Industrial Applicability

By adding a protocol enhancement module, which obtains a service standard type of a message, between an SCCP protocol module and RNSAP protocol modules, the disclosure assists the SCCP protocol module and the RNSAP protocol modules in correctly and quickly establishing a corresponding relationship, saves software maintenance cost, makes up shortages of current SCCP and RNSAP protocols when supporting the multimode controller, and realizes to a function of processing signalling according to standards. Furthermore, when being only configured as a single mode or presenting in the manner of multimode, the multimode controller needs not to be modified functionally, and can accurately forward a signalling to a corresponding standard of wireless network control service layer to process.

What is claimed is:

1. A method for processing an incoming message of a multimode controller, comprising:
   receiving, by a multimode controller, an incoming message from an abutting network element, and parsing the incoming message to construct an N-primitive message;
   obtaining a service standard type of the incoming message according to the N-primitive message; and
   processing the N-primitive message according to the service standard type.

2. The method according to claim 1, wherein the step of obtaining a service standard type of the incoming message according to the N-primitive message comprises:
   pre-decoding a Radio Network Subsystem Application Part (RNSAP) message in the N-primitive message; and
   obtaining the service standard type of the incoming message according to a pre-decoded result.

3. The method according to claim 1, wherein the step of obtaining a service standard type of the incoming message according to the N-primitive message comprises:
   obtaining transport layer information by parsing the N-primitive message; and
   obtaining the service standard type of the incoming message according to the transport layer information and a standard attribute table.

4. The method according to claim 3, wherein the standard attribute table comprises: local end signalling points and thereof standard attribute fields, and/or opposite end signalling points and thereof standard attribute fields;
   or the standard attribute table comprises: local end signalling point code, opposite end signalling point code, and corresponding network interface type fields;
   or the standard attribute table comprises: local end signalling point code, opposite end signalling point code, corresponding network interface type fields, and standard attribute fields of local or opposite ends.

5. The method according to claim 4, wherein the transport layer information comprises Origination Point Code (OPC) and/or Destination Point Code (DPC).

6. The method according to claim 3, wherein the transport layer information comprises Origination Point Code (OPC) and/or Destination Point Code (DPC).

7. A device for processing an incoming message of a multimode controller, comprising:
   a Signalling Connection Control Part (SCCP) protocol module configured to receive an incoming message from an abutting network element, and parse the incoming message to construct an N-primitive message;
   a protocol enhancement module configured to obtain a service standard type of the incoming message according to the N-primitive message, and send the N-primitive message to a corresponding standard of Radio Network Subsystem Application Part (RNSAP) protocol module; and
   multiple standards of RNSAP protocol modules configured to process a corresponding standard of N-primitive message.

8. The device according to claim 7, wherein the protocol enhancement module comprises:
   a parsing unit configured to pre-decode an RNSAP message in the N-primitive message;
   a standard type obtaining unit configured to obtain the service standard type of the incoming message according to a pre-decoded result; and
   a forwarding unit configured to send the N-primitive message according to the service standard type of the incoming message to a corresponding standard of RNSAP protocol module on a wireless control plane.

9. The device according to claim 8, wherein
   the parsing unit is further configured to obtain transport layer information by parsing the N-primitive message; and
   the standard type obtaining unit is further configured to obtain the service standard type of the incoming message according to the transport layer information and a standard attribute table.

10. The device according to claim 9, wherein the standard attribute table comprises: local end signalling points and thereof standard attribute fields, and/or opposite end signalling points and thereof standard attribute fields;
   or the standard attribute table comprises: local end signalling point code, opposite end signalling point code, and corresponding network interface type fields;
   or the standard attribute table comprises: local end signalling point code, opposite end signalling point code, corresponding network interface type fields, and standard attribute fields of local or opposite ends.

11. A multimode controller, comprising a device for processing an incoming message of a multimode controller, and the device comprises:
   a Signalling Connection Control Part (SCCP) protocol module configured to receive an incoming message from an abutting network element, and parse the incoming message to construct an N-primitive message;

a protocol enhancement module configured to obtain a service standard type of the incoming message according to the N-primitive message, and send the N-primitive message to a corresponding standard of Radio Network Subsystem Application Part (RNSAP) protocol module; and multiple standards of RNSAP protocol modules configured to process a corresponding standard of N-primitive message.

12. The multimode controller according to claim 11, wherein the protocol enhancement module comprises:

a parsing unit configured to pre-decode an RNSAP message in the N-primitive message;

a standard type obtaining unit configured to obtain the service standard type of the incoming message according to a pre-decoded result; and a forwarding unit configured to send the N-primitive message according to the service standard type of the incoming message to a corresponding standard of RNSAP protocol module on a wireless control plane.

13. The multimode controller according to claim 12, the parsing unit is further configured to obtain transport layer information by parsing the N-primitive message; and the standard type obtaining unit is further configured to obtain the service standard type of the incoming message according to the transport layer information and a standard attribute table.

14. The multimode controller according to claim 13, wherein the standard attribute table comprises: local end signalling points and thereof standard attribute fields, and/or opposite end signalling points and thereof standard attribute fields;

or the standard attribute table comprises: local end signalling point code, opposite end signalling point code, and corresponding network interface type fields;

or the standard attribute table comprises: local end signalling point code, opposite end signalling point code, corresponding network interface type fields, and standard attribute fields of local or opposite ends.

\* \* \* \* \*